Patented Jan. 9, 1940

2,186,274

UNITED STATES PATENT OFFICE 2,186,274

ACYL-ACETIC ARYLIDES HAVING SUBSTANTIVE PROPERTIES

Robert Schmitt, Darmstadt, and Hans Albert, Offenbach-on-the-Main, Germany, assignors to General Aniline Works, Inc., New York, N. Y., a corporation of Delaware No Drawing. Application December 29, 1938, Serial No. 248,256 In Germany December 31, 1937

6 Claims. (Cl. 260—559)

The present invention relates to acyl-acetic arylides having substantive properties; more particularly it relates to compounds of the following general formula:

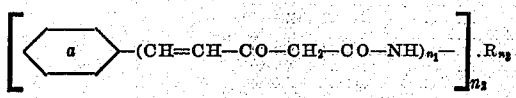

wherein $n_1$, $n_2$ and $n_3$ stand for one of the numbers 1 and 2, R means a radical of the benzene, naphthalene or diphenyl series, and wherein the benzene nucleus $a$ may contain substituents.

It has already been proposed to use, for the manufacture of ice-colors, acyl-acetic arylides obtainable by condensing acetoacetic esters, benzoylacetic esters or aroylene-bis-acetic esters with amino bases. Such arylides are, for instance, described in British Patents Nos. 210,217, 211,814, 211,772, 365,531 and 355,709. In practice, especially for dyeing hanks, a large number of these arylides can only be used to a limited extent, since they have only a low affinity for natural or regenerated cellulose. Those azo-components are mainly concerned which are prepared from aceto-acetic esters or benzoyl-acetic esters and mono-amino-bases of the benzene series. In order to impart to such products a sufficient affinity, mono- or diamino-bases of the aromatic series having in themselves substantive properties had to be used for the condensation. Only the arylides from aroylene-bis-acetic esters and simple amino-bases show a distinct affinity for the cellulose fiber.

Now we have found that acyl-acetic arylides having substantive properties may generally be obtained by condensing with an amino-base an acyl-acetic ester the acyl group of which is an aryl-acrylic acid radical or an arylene-bis-acrylic acid radical which may contain substituents in the aryl radical.

As compared with the comparable acyl-acetic arylides known from the literature, the arylides obtainable by the invention are distinguished by an enhanced affinity for natural or regenerated cellulose fibers and are, therefore, valuable intermediate products for the production of insoluble azo-dyestuffs on the fiber by the ice-color method.

The following examples serve to illustrate the invention, but they are not intended to limit it thereto; the parts are by weight:

(1) A solution of 17.0 parts of phenyl-acrylyl-acetic ethyl ester in 100 parts of xylene is slowly run, while stirring, into a boiling mixture of 13.2 parts of 1-amino-2,5-dimethoxy-4-chlorobenzene and 180 parts of xylene, and the whole is heated to boiling, until the elimination of alcohol is at an end. After cooling, the crystalline mass which has separated is filtered with suction, washed with xylene and dried. The 1-phenyl-acrylyl-acetylamino-2,5-dimethoxy-4-chlorobenzene melting at 158° C. to 159° C. (uncorrected) is thus obtained with a yield which amounts to 80 per cent of the theoretical. The arylide corresponds with the following formula:

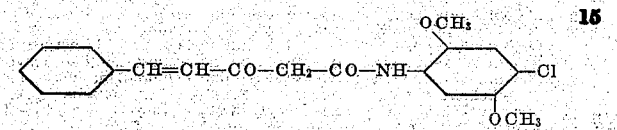

When there is used, instead of the phenyl-acrylyl-acetic ethyl ester, equivalent amounts of 2,5-dichlorophenylacrylyl-acetic ethyl ester and, instead of xylene, naphtha-solvent, the 1-(2',5'-dichlorophenylacrylyl-acetylamino)-2,5-dimethoxy-4-chlorobenzene melting at 175° C. to 176° C. is obtained with the same good yield.

(2) A solution of 50 parts of 4-chlorophenyl-acrylyl-acetic ethyl ester melting at 66° C. to 67° C. in 100 parts of xylene is slowly run, while stirring, into a boiling mixture of 21.2 parts of o-tolidine and 500 parts of xylene. The whole is further heated to boiling, until the elimination of alcohol is at an end. After cooling, the crystals which have separated are filtered with suction and washed with xylene. The 4,4'-bis-(4''-chloro-phenylacrylyl-acetyl-amino)-3,3'-dimethyl-diphenyl melting at 236° C. to 237° C. (uncorrected) is thus obtained with a yield which exceeds 75 per cent of the theoretical.

(3) 35.8 parts of para-phenylene-bis-acrylyl-acetic ethyl ester, melting at 115° C. to 116° C., and 500 parts of xylene are heated together to boiling; a solution of 34.2 parts of 1-amino-2-methoxy-5-methyl-4-chlorobenzene in 400 parts of xylene is then slowly run in, while stirring. The whole is kept at boiling temperature, until the elimination of alcohol is finished. After cooling the crystalline mass which has separated is filtered with suction and dried. The paraphenylene-bis-acrylylacetyl-bis-(1 - amino - 2 - methoxy-5-methyl-4-chlorobenzene) of the following formula:

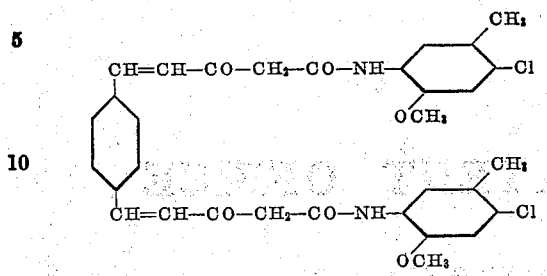

is obtained, with a good yield, in the form of an orange-yellow crystalline powder melting at 228° C. to 230° C. (uncorrected). It is soluble in glacial acetic acid, xylene and chlorobenzene, while being insoluble in ether.

In the same manner the substituted acylacetic arylides cited in the following table are obtained:

|   | | Melting point |
|---|---|---|
| | | °C. |
| 1 | Phenylacrylyl-acetyl-1-amino-2-methyl-4-chlorobenzene | 124-125 |
| 2 | Phenylacrylyl-acetyl-1-amino-2,5-dimethoxybenzene | 106-107 |
| 3 | Phenylacrylyl-acetyl-1-amino-4-nitrobenzene | 172-173 |
| 4 | Phenylacrylyl-acetyl-1-amino-4-chloro-2-methoxy-5-nitrobenzene | 189-190 |
| 5 | Phenylacrylyl-acetyl-1-amino-4-ethoxybenzene | 141-142 |
| 6 | Phenylacrylyl-acetyl-1-amino-3,4-dimethoxy-6-chlorobenzene | 129-130 |
| 7 | Phenylacrylyl-acetyl-1-amino-4-chloro-2-methoxy-5-methylbenzene | 129-130 |
| 8 | Phenylacrylyl-acetyl-1-amino-4-benzoylamino-2,5-dimethoxybenzene | 129-130 |
| 9 | Bis-4,4'-(phenylacrylyl-acetylamino)-3,3'-dimethyldiphenyl | 200-201 |
| 10 | Phenylacrylyl-acetyl-2-aminonaphthalene | 134-135 |
| 11 | Phenylacryl-acetyl-3-amino-2-methoxynaphthalene | 144-145 |
| 12 | 4'-chlorophenylacrylyl-acetyl-1-amino-4-chloro-2,5-dimethoxybenzene | 165-166 |
| 13 | 4'-chlorophenylacrylyl-acetyl-1-amino-3,4-dimethoxy-6-chlorobenzene | 175-176 |
| 14 | 4'-chlorophenylacrylyl-acetyl-1-amino-4-chloro-2-methoxy-5-methylbenzene | 165-166 |
| 15 | 4'-chlorophenylacrylyl-acetyl-1-amino-4-benzoylamino-2,5-dimethoxybenzene | 196-197 |
| 16 | 2'-chlorophenylacrylyl-acetyl-1-amino-4-chloro-2,5-dimethoxybenzene | 183-184 |
| 17 | 2'-chlorophenylacrylyl-acetyl-1-amino-3,4-dimethoxy-6-chlorobenzene | 152-153 |
| 18 | 2'-chlorophenylacrylyl-acetyl-1-amino-4-benzoylamino-2,5-diethoxybenzene | 166-167 |
| 19 | Bis-4,4'-(2''-chlorophenyl-acrylyl-acetylamino)-3,3'-dimethyl-diphenyl | 225-226 |
| 20 | 2',5'-dichloro-phenylacrylyl-acetyl-1-amino-3,4-dimethoxy-6-chlorobenzene | 176-177 |
| 21 | 2',5'-dichloro-phenylacrylyl-acetyl-1-amino-4-benzoyl-amino-2,5-dimethoxybenzene | 212-213 |
| 22 | Bis-4,4'-(2'',5''-dichloro-phenylacrylyl-acetylamino)-3,3'-dimethyldiphenyl | 220 |
| 23 | 2',6'-dichloro-phenylacrylyl-acetyl-1-amino-4-chloro-2,5-dimethoxybenzene | 170-171 |
| 24 | 2',6'-dichloro-phenylacrylyl-acetyl-1-amino-6-chloro-3,4-dimethoxybenzene | 172-173 |
| 25 | 2',6'-dichloro-phenylacrylyl-acetyl-1-amino-4-chloro-2-methoxy-5-methylbenzene | 161-162 |
| 26 | 2',6'-dichloro-phenylacrylyl-acetyl-1-amino-4-ethoxybenzene | 120-121 |
| 27 | Bis-4,4'-(2'',6''-dichlorophenylacrylyl-acetylamino)-3,3'-dimethyl-diphenyl | 233-234 |
| 28 | 4'-methoxy-phenylacrylyl-acetyl-1-amino-4-chloro-2,5-dimethoxybenzene | 184-185 |
| 29 | 4'-methoxy-phenylacrylyl-acetyl-1-amino-6-chloro-3,4-dimethoxybenzene | 159-160 |
| 30 | 4'-methoxy-phenylacrylyl-acetyl-1-amino-4-benzoylamino-2,5-dimethoxybenzene | 172-173 |
| 31 | Bis-4,4'-(4''-methoxy-phenylacrylyl-acetylamino)-3,3'-dimethyl-diphenyl | 225-226 |
| 32 | 3',4'-dimethoxy-phenylacrylyl-acetyl-1-amino-4-chloro-2,5-dimethoxybenzene | 161-162 |
| 33 | 3',4'-dimethoxy-phenylacrylyl-acetyl-1-amino-6-chloro-3,4-dimethoxybenzene | 191-192 |
| 34 | 3',4'-dimethoxy-phenylacrylyl-acetyl-1-amino-4-benzoyl-amino-2,5-diethoxybenzene | 170-171 |
| 35 | Bis-4,4'-(3'',4''-dimethoxy-phenylacrylyl-acetylamino)-3,3'-dimethyl-diphenyl | [1] 270 |
| 36 | 3',4'-methylenedioxy-phenylacrylylacetyl-1-amino-4-chloro-2,5-dimethoxybenzene | 146-147 |
| 37 | 3',4'-methylenedioxy-phenylacrylylacetyl-1-amino-4-benzoylamino-2,5-diethoxybenzene | 214-215 |
| 38 | 3',4'-methylenedioxy-phenylacrylylacetyl-1-amino-2-methoxy-5-methyl-4-chlorobenzene | 176-177 |
| 39 | 3',4'-methylenedioxy-phenylacrylyl-acetyl-1-amino-2-chloro-4-ethoxybenzene | 162-163 |
| 40 | Bis-4,3'-(3'',4''-methylenedioxy-phenylacrylyl-acetylamino)-3,3'-dimethyldiphenyl | 259-260 |
| 41 | Para-phenylene-di-acrylyl-acetyl-bis-(1-amino-2,5-dimethoxy-4-chlorobenzene) | [1] 265-266 |

[1] With decomposition.

We claim:
1. The acyl-acetic arylides of the following general formula

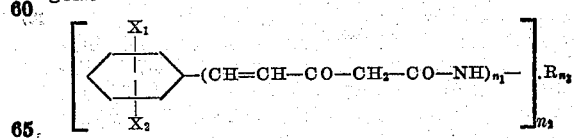

wherein $n_1$, $n_2$ and $n_3$ stand for one of the numbers 1 and 2, $X_1$ and $X_2$ stand for members of the group consisting of hydrogen, chlorine and methoxy, and R means a member of the group consisting of radicals of the benzene, naphthalene and diphenyl series, being yellowish-colored crystalline substances which are soluble in caustic soda solution and high-boiling organic solvents and have a remarkable affinity for natural and regenerated cellulose fibers.

2. The acyl-acetic arylides of the following general formula:

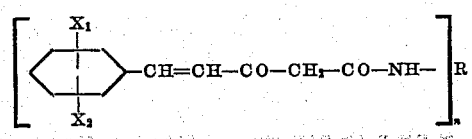

wherein $n$ stands for one of the numbers 1 and 2, $X_1$ and $X_2$ stand for members of the group consisting of hydrogen, chlorine and methoxy, and R means a member of the group consisting of radicals of the benzene, naphthalene and diphenyl series, being yellowish-colored crystalline substances which are soluble in caustic soda solution and high-boiling organic solvents and have a remarkable affinity for natural and regenerated cellulose fibers.

3. The acyl-acetic arylides of the following general formula:

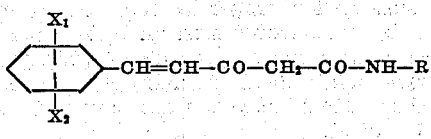

wherein $X_1$ and $X_2$ stand for members of the group consisting of hydrogen, chlorine and methoxy, and R means a radical of the benzene series, being yellowish-colored crystalline substances which are soluble in caustic soda solution and high-boiling organic solvents and have a remarkable affinity for natural and regenerated cellulose fibers.

4. The 1-(phenylacrylyl-acetylamino)-2,5-dimethoxy-4-chlorobenzene of the following formula:

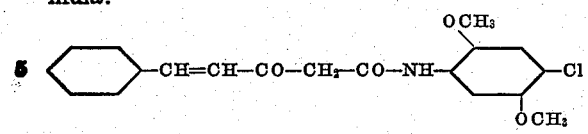

being a feebly yellowish crystalline powder, melting at 158° C. to 159° C.

5. The 1-(4'-chlorophenylacrylyl-acetyl-amino)-2,5-dimethoxy-4-chlorobenzene of the formula:

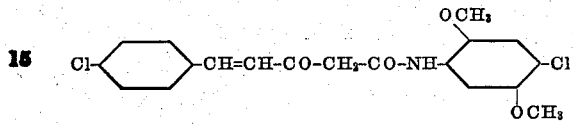

being yellow crystals, melting at 165° C. to 166° C.

6. The 1-(4'-methoxyphenylacrylyl-acetylamino)-2,5-dimethoxy-4-chlorobenzene of the formula:

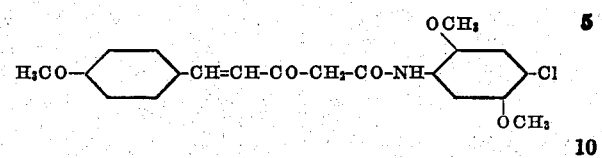

being a greenish-yellow crystalline powder, melting at 184° to 185° C.

ROBERT SCHMITT.
HANS ALBERT.